(12) United States Patent
Olinski

(10) Patent No.: US 7,558,212 B2
(45) Date of Patent: Jul. 7, 2009

(54) SYSTEM AND METHOD FOR FAULT IDENTIFICATION

(75) Inventor: Jerome Edwin Olinski, Stoney Creek (CA)

(73) Assignee: BCE Inc., Verdun, Quebec (CA)

( * ) Notice: Subject to any disclaimer, the term of this patent is extended or adjusted under 35 U.S.C. 154(b) by 875 days.

(21) Appl. No.: 11/002,305

(22) Filed: Dec. 3, 2004

(65) Prior Publication Data

US 2006/0067239 A1   Mar. 30, 2006

Related U.S. Application Data

(63) Continuation of application No. PCT/CA2004/001738, filed on Sep. 24, 2004.

(51) Int. Cl.
*G01R 31/08* (2006.01)
*H04L 12/26* (2006.01)

(52) U.S. Cl. ..................................... 370/242
(58) Field of Classification Search ............... 370/216, 370/241–242; 714/1, 100
See application file for complete search history.

(56) References Cited

U.S. PATENT DOCUMENTS

| | | | |
|---|---|---|---|
| 4,291,204 A | 9/1981 | Crick | |
| 4,739,276 A | 4/1988 | Graube | |
| 5,093,568 A | 3/1992 | Maycock | |
| 5,461,318 A | 10/1995 | Borchert et al. | |
| 5,754,285 A | 5/1998 | Eslambolchi et al. | |
| 5,777,662 A * | 7/1998 | Zimmerman | 725/125 |
| 6,385,561 B1 | 5/2002 | Soraghan et al. | |
| 6,453,016 B1 | 9/2002 | Chea, Jr. | |
| 6,532,215 B1 | 3/2003 | Muntz | |
| 6,538,451 B1 | 3/2003 | Galli et al. | |
| 6,588,016 B1 | 7/2003 | Chen et al. | |
| 6,614,236 B1 | 9/2003 | Karam | |
| 6,621,562 B2 | 9/2003 | Durston | |
| 7,068,758 B1 * | 6/2006 | Wallace et al. | 379/29.05 |
| 2004/0004709 A1 * | 1/2004 | Pitchforth | 356/73.1 |
| 2007/0121792 A1 * | 5/2007 | Chong | 379/1.01 |

FOREIGN PATENT DOCUMENTS

| | | |
|---|---|---|
| EP | 0 691 546 A2 | 10/1996 |
| JP | 08095886 A | 4/1996 |
| WO | WO 02/25505 A1 | 3/2002 |

OTHER PUBLICATIONS

PCT/CA2004/001738 (ISR), Jul. 6, 2005, BCE Inc.

* cited by examiner

*Primary Examiner*—Kevin C Harper

(57) ABSTRACT

A novel method and system for fault identification is provided. A test head that is operable to generate a test signal along a pathway is employed. The test head is based on time domain reflectometry, and is thus operable to provide an estimated physical distance of where a fault occurs along the pathway. The response test signal is matched with a known set of information about the cable and junctions and other components associated with the pathway, including information about the physical location of those components. As part of the matching, an actual real-world physical location can be identified as to where the fault likely occurs, thereby reducing the need for a service technician to attempt to physically locate the fault himself.

26 Claims, 8 Drawing Sheets

SYSTEM AND METHOD FOR FAULT IDENTIFICATION

PRIORITY CLAIM

The present application is a continuation application claiming priority from PCT Patent Application Number PCT/CA2004/001738, filed Sep. 24, 2004, the contents of which are incorporated herein by reference.

FIELD OF THE INVENTION

The present invention relates generally to telecommunications and more particularly relates to a system and method for fault identification.

BACKGROUND OF THE INVENTION

Telecommunications has advanced such that there is now a vast array of services and technologies available to consumers. As services become more sophisticated, and competition more widespread, there is a natural pressure to reduce costs and improve efficiencies in the administration of a telecommunication network.

Significant costs in network administration arise any time there is a need for a so-called "truck roll", as a service technician is dispatched to find and repair a fault in the network. As a more specific example, in wired telephone networks based on traditional copper twisted-pair, very often a problem will require the dispatching of a service technician to physically attend at the central office that services the customer, and/or the customer sites, and/or a variety of locations in between in order to find and repair the fault. Where the distance between the central office and the customer is great, the costs are often higher.

To help pinpoint the location of the fault, it is known to locate "test heads" along the path between the central office and the customer sites. Such test heads can be based on a variety of technologies, and are intended to look perform discrete metal readings along a designated pathway, with a view to identifying ground shorts, crosses and the like.

The introduction of digital subscriber line ("DSL") to twisted-pair networks has only increased the demand for physical integrity of each twisted-pair circuit. By the same token, the digital subscriber line access module ("DSLAM") is typically located intermediate legacy test heads and the subscriber sites, such that the DSLAM effectively filters out the signal generated by the test head and therefore interfering with the ability of the test head to provide meaningful fault identification. Legacy test heads located inside central offices are further hampered by the sheer complexity of the circuitry in the central office, as the central office itself effectively filters out signals generated by the test head.

It is known to employ more sophisticated types of test heads to address the foregoing issues, and in particular by positioning those test heads at different locations along the twisted pair circuit when performing the test. One such sophisticated type of test head are those test heads used in locating faults on DSL lines that are based on a Time Domain Reflectometer (TDR). See for example, U.S. Pat. Nos. 5,461,318 and 6,385,561, the contents of which are incorporated herein by reference. Such prior art uses of TDR can be helpful in actually providing an indication of the distance from the test head to the fault, however, it still does not provide a location of the fault, thereby requiring that a service technician trace the length of the twisted pair until the indicated distance is reached.

SUMMARY OF THE INVENTION

It is an object of the present invention to provide a novel system and method for fault identification that obviates or mitigates at least one of the above-identified disadvantages of the prior art.

According to an aspect of the invention there is provided a method for identifying a fault along a link comprising the steps of:
  receiving a response signal representing a test signal sent along said link;
  receiving data representing location information corresponding to a physical pathway of said link;
  comparing said response signal with said information; and,
  outputting at least one potential physical location of said fault based on said comparing step.

The response signal can comprise a distance from a point where said test signal was generated to said fault. The location information can be stored in a geographic information system database.

The link can be a copper twisted pair that spans an outside plant interface and a subscriber premises. The link can be less than or equal to about five thousand meters in length. The link can be less than or equal to about three thousand meters in length. The link can be less than or equal to about one thousand meters in length. The test signal can be generated by a test head mounted in the outside plant interface. The test head can be remotely activatable in order to generate the test signal.

The comparing step of the method can comprise the steps of determining a physical length along the link where the fault is potentially occurring and matching the physical length with information derived from a database representing a known physical location along the link corresponding to the length.

The known physical location can include a set of geographic coordinates. The geographic coordinates can be derived from the global positioning system ("GPS") and the method can further comprise the step of delivering the coordinates to a client device accessible to a service technician to be deployed for repairing the fault.

The link can also be coaxial cable, or a fibre optical cable, or an electrical transmission line.

Another aspect of the invention provides a system for identifying a fault along a link comprising a test head for sending a test signal along the link. The test is also for receiving a response signal corresponding to the test signal. The system also includes a computing device for receiving the response signal from the test head. The computing device is operable to access a storage device connected to the computing device. The storage device is for storing location information corresponding to the link. The computing device is further operable to receive location information from the storage device and perform a comparison between the response signal and the location information to generate at least one potential physical location of the fault.

Another aspect of the invention provides a computing device for identifying a fault along a link. The computing device is connectable to a test head. The test head is operable to send a test signal along the link. The test head is further operable to receive a response signal corresponding to the test signal and deliver the response signal to the computing device. The computing device is further operable to access a storage device connectable to the computing device for storing location information corresponding to the link. The computing device is further operable to receive location information from the storage device and perform a comparison between the response signal and the location information to generate at least one potential physical location of the fault.

Another aspect of the invention provides a computer readable medium containing a plurality of programming instructions for a computing device for identifying a fault along a link, the programming instructions including the steps of:

receiving a response signal representing a test signal sent along the link;

receiving data representing location information corresponding to a physical pathway of the link;

comparing the response signal with the information; and, outputting at least one potential physical location of the fault based on the comparing step.

Another aspect of the invention provides a method for identifying fault along a pathway comprising the steps of:

receiving data representing the pathway from a source location to a target location;

generating a test signal along the pathway;

receiving a response signal along at least a portion of the pathway;

receiving data representing cable information associated with the pathway, the cable information including a plurality of physical locations;

matching the response signal with the cable information; and, determining a potential physical location of the fault based on the matching step.

BRIEF DESCRIPTION OF THE DRAWINGS

The invention will now be described by way of example only, and with reference to the accompanying drawings, in which.

DETAILED DESCRIPTION OF THE INVENTION

Figure 1:
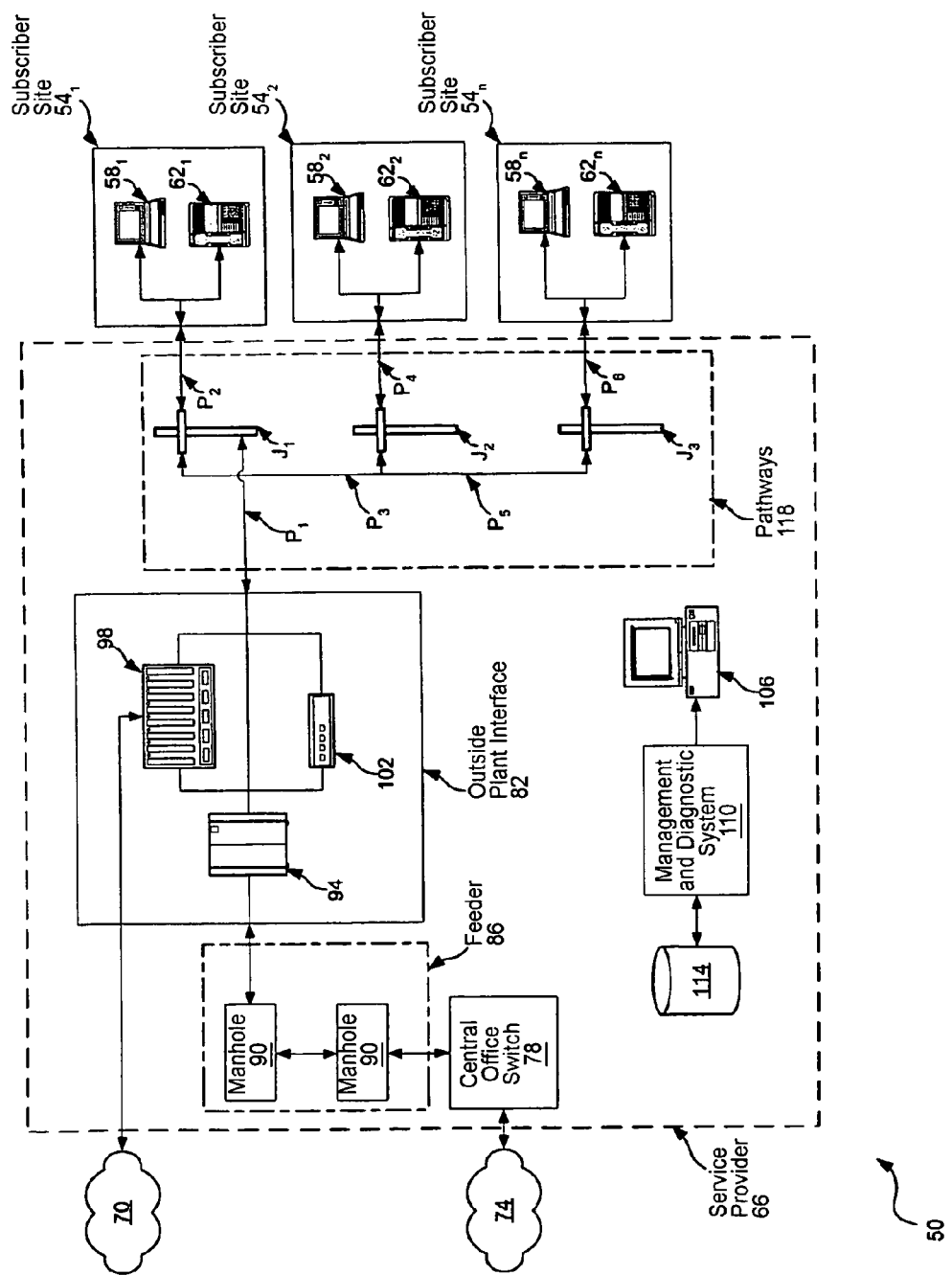
FIG. 1 is a schematic representation of a system for fault identification in accordance with an embodiment of the invention.

Referring now to FIG. 1, a system for fault identification is indicated generally at 50. In a present embodiment, system 50 is built upon the plain old telephone system ("POTS") and thus comprises a plurality of subscriber sites $54_1, 54_2 \ldots 54_n$ (generically referred to herein as subscriber site 54, and collectively as subscriber sites 54). Each subscriber site 54 in turn includes a computing device 58 and a telephony device 62. A service provider 66 allows computing devices 58 to connect to the Internet 70, and allows telephony devices 62 to connect to the public switched telephone network ("PSTN") 74.

More specifically, service provider 66 includes a central office switch 78 which carries calls from telephony devices 62 over PSTN 74. In turn, switch 78 connects to an outside plant interface 82 ("OPI") via a feeder 86. In a present exemplary embodiment, feeder 86 comprises a plurality of manholes 90, but it is to be understood in general that feeder 86 comprises any combination of cabling, bridges, junctions etc. that would normally be found between central office switch 78 and OPI 82.

OPI 82 comprises a junction panel 94, a DSLAM 98. An exemplary DSLAM is the Stinger® Compact Remote from Lucent Technologies, 600 Mountain Ave, Murray Hill, N.J. 07974-0636, but other DSLAMs can be used. OPI 82 also includes a test head 102. Junction panel 94 is used to couple twisted pairs arriving from feeder 86 with corresponding twisted pairs destined for subscriber sites 54 so that calls can be carried between telephony devices 62 and PSTN 74. DSLAM 98 joins Internet 70 with twisted pairs destined for subscriber sites 54 so that data connections can be carried between computing devices 58 and Internet 70. Test head 102, which in a present embodiment is based on TDR technology, can be used to test for faults along twisted pairs destined for subscriber sites 54. An example of a TDR test head that can be used is a CableSHARK™ from Consultronics Limited, 160 Drumlin Circle, Concord, Ontario, Canada, L4K 3E5, that is modified to complement the other features of the present embodiment, but other test heads can be used as desired. OPI 82 is typically located on a street or other outdoor location and is within a predefined range of each subscriber sites 54 such that a given service level (i.e. bit rate) can be guaranteed for a particular computing device 58 accessing Internet 70 via DSLAM 98. In a present embodiment, OPI 82 is within about one thousand meters of all subscriber sites 54. In other embodiments, OPI 82 is within about five thousand meters of all subscriber sites 54, and in still other embodiments OPI 82 is within about three thousand meters of all subscriber sites 82. In general such distances can be varied according to the performance characteristics of the particular DSLAM 98 and/or test head 102 that is being employed. Accordingly, it should now be apparent that system 50 is scalable. For example, a central office such as central office 78 can service a plurality of OPIs and in turn service a plurality of subscriber sites. System 50 can also include a plurality of central offices, each serving a plurality of OPIs.

System 50 also includes a customer care workstation 106 that is operated by a customer service representative associated with service provider 66. Workstation 106 in turn is connected to a management and diagnostics system 110, which in a present embodiment is based on the Access Care Operating Support Systems ("OSS") from Nortel Networks, 8200 Dixie Road, Brampton, Ontario L6T 5P6 Canada. A customer service representative operating workstation 106 is thus able to receive calls from subscribers for each site 54 and to provide the usual management and diagnostic support as is currently offered by a system such as system 110. Additionally, however, system 110 is also connected to a database 114 that includes information about the twisted pairs running between OPI 82 and subscriber sites 54. In a present embodimetn, the information in database 114 is geographic information that can be coordinated and/or matched with TDR signals for a given pathway. As will be discussed in greater detail below, in addition to the functionality traditionally associated with system 110, system 110 is also operable to access database 114, and communicate with test head 102, in order to identify faults in twisted pairs running between OPI 82 and sites 54.

Thus, the twisted pair between each subscriber site 54 and OPI 82 follows a set of pathways, indicated generally at 118 on FIG. 1. Pathways 118 can be characterized by cable bundles of twisted pairs, each bundle being based on different cable designs. Pathways 118 can also be characterized by junctions, bridge points, splice points, wire locations, etc. As can be seen on FIG. 1, in system 50 pathways 118 include a plurality of paths P and junctions J. Such characterizations are stored as information in database 114. Table I shows an exemplary format of such information, that corresponds with the specific pathways 118 shown in FIG. 1.

TABLE I

Cable information about pathways 118 Stored in Database 114

|  | Field 1 Site | Field 2 Path | Field 3 Begin Point | Field 4 Cable Identifier | Field 5 Twisted Pair Identifier | Field 6 Cable Type | Field 7 End Point | Field 8 Length |
|---|---|---|---|---|---|---|---|---|
| Row 1 | $54_1$ | $P_1$ | OPI 82 | 1 | 1 | A | Junction $J_1$ | 300 m |
| Row 2 | $54_1$ | $P_2$ | Junction $J_1$ | 2 | 1 | B | Customer Sites $54_1$ | 100 m |
| Row 3 | $54_2$ | $P_1$ | OPI 82 | 1 | 2 | A | Junction $J_1$ | 300 m |
| Row 4 | $54_2$ | $P_3$ | Junction $J_1$ | 3 | 1 | A | Junction $J_2$ | 200 m |
| Row 5 | $54_2$ | $P_4$ | Junction $J_2$ | 4 | 1 | B | Customer Sites $54_2$ | 100 m |
| Row 6 | $54_3$ | $P_1$ | OPI 82 | 1 | 3 | A | Junction $J_1$ | 300 m |
| Row 7 | $54_3$ | $P_3$ | Junction $J_1$ | 3 | 2 | A | Junction $J_2$ | 200 m |
| Row 8 | $54_3$ | $P_5$ | Junction $J_2$ | 5 | 1 | A | Junction $J_3$ | 200 m |
| Row 9 | $54_3$ | $P_6$ | Junction $J_3$ | 6 | 1 | B | Customer Sites $54_3$ | 100 m |

Figure 2:
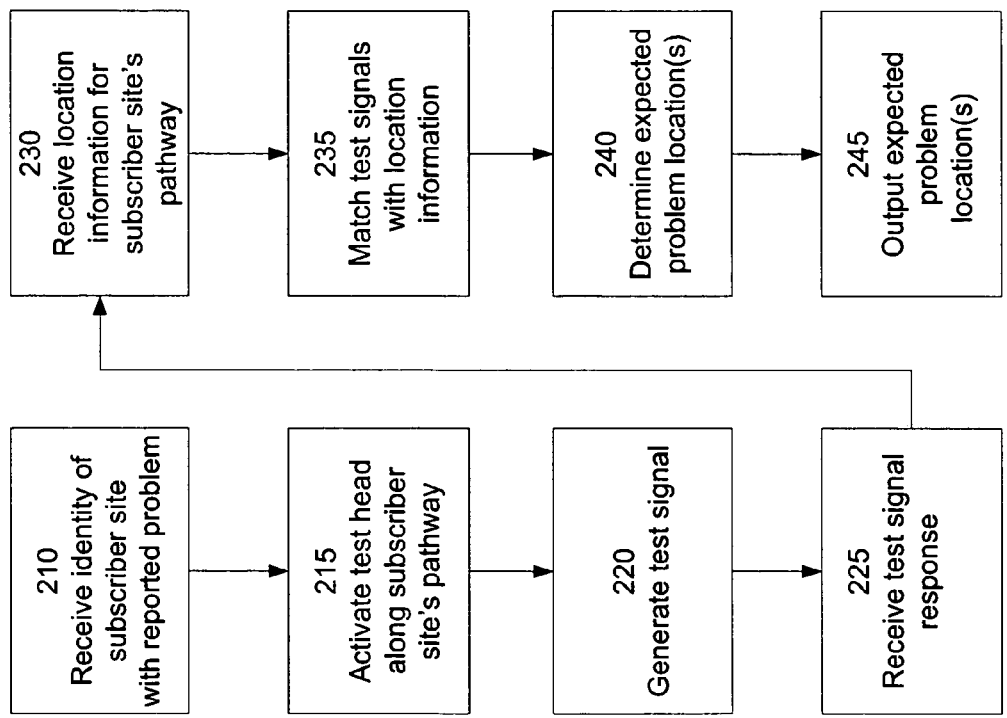
FIG. 2 is a flowchart depicting a method of fault identification in accordance with another embodiment of the invention.

Thus, Field 1, "Site" identifies the particular sites 54 associated with the cable information in the same row. Field 2, "Path" identifies the particular path corresponding with the respective path P that is shown in FIG. 2, along which the cable in question runs. Field 3 "Begin Point", identifies where the particular cable begins its run—or in other words where the path P of the respective cable bundle begins. Field 4, "Cable Identifier", identifies a unique number associated with the particular cable that runs along the respective path, where each cable itself contains a bundle of twisted pairs. In the present example, for reasons of simplicity, there is only one unique cable identifier per path P. Field 5, "Twisted Pair Identifier" identifies the particular twisted pair within the corresponding cable. Field 6, "Cable Type", provides mechanical and/or other specifications about the cable. In the example in table I, Cable Type is limited to type "A" and type "B". However, Cable Type can include information such as gauge, number of twisted pairs within the cable bundle, how the cable is designed (i.e. grease filled, air filled, etc.) and/or any other desired information. Field 7 "End Point", identifies where the particular cable ends its run—or in other words where the path P respective to that cable bundle ends. Field 8, "Length", identifies the length of the particular path P respective to that cable bundle. While not shown in Table I, a map or address of a physical location of each particular OSI, junction or site, is also stored in database 114, so that a service technician can immediately locate the OSI, junction or site and be dispatched thereto with relative ease. Also not shown in Table I is a map that shows each individual path P is also stored in database 114, so that a service technician can readily trace the route of a particular P to reduce the amount of time that the technician need spend tracing the cable along that path P.

It should now be apparent that the plurality of rows having the same site 54 in Field 1 collectively identify the complete sequence of twisted pairs running from OPI 82 to that site 54. More specifically, paths $P_1$ and $P_2$, joined via junction $J_1$, collectively identify the path from OPI 82 to site $54_1$. Paths $P_1$ and $P_3$ (joined via junction $J_1$) and paths $P_3$ and $P_4$ (joined via junction $J_2$), collectively identify the path from OPI 82 to site $54_2$. Paths $P_1$, $P_3$, (joined via junction $J_1$) and paths $P_3$ and $P_5$ (joined via junction $J_2$) and paths $P_5$ and $P_6$ (joined via junction $J_3$) respectively, collectively identify the path from OPI 82 to site $54_2$. The other information in Table I can thus be used by a service technician to identify which particular cables and twisted pairs within those cables belong to a specific site 54 for a particular path P or junction J.

Referring now to FIG. 2, a method for fault identification, in accordance with another embodiment of the invention, is indicated generally at 200. In order to assist in the explanation of the method, it will be assumed that method 200 is operated using system 50. Furthermore, the following discussion of method 200 will lead to further understanding of system 50 and its various components. It should be understood that the steps in method 200 need not be performed in the exact sequence shown. Further, it is to be understood that system 50 and/or method 200 can be varied, and need not work exactly as discussed herein in conjunction with each other, and that such variations are within the scope of the present invention.

Figure 3:
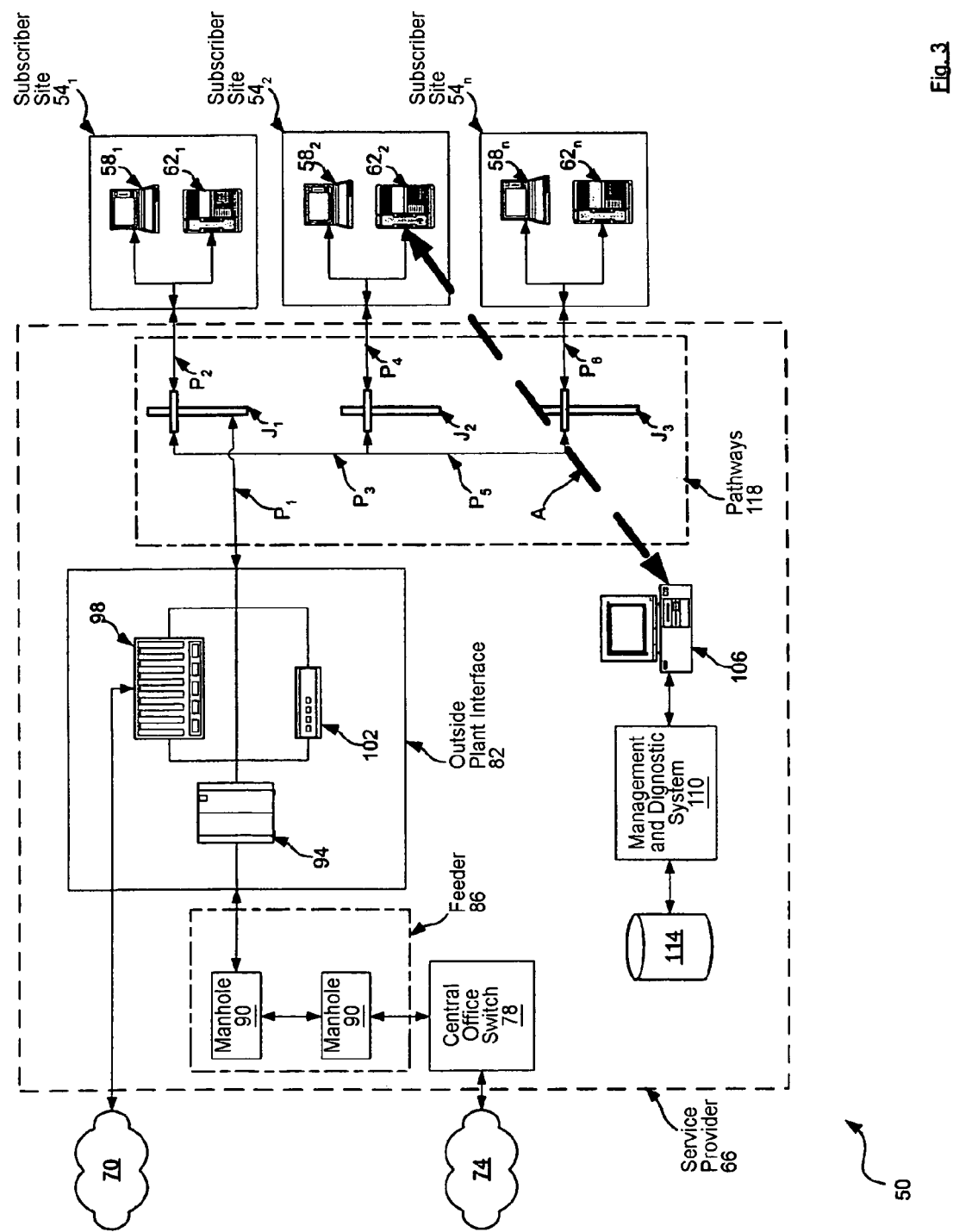
FIG. 3 shows the system of FIG. 1 during the performance of one of the steps of the method in FIG. 2.

Beginning at step 210, an identity of a subscriber site with a reported problem is received. When performed on system 50, this step will occur when a subscriber at a particular site 54 has difficulty with either voice or data services, and contacts a customer service representative at workstation 106 to notify service provider 66 of the problem. As an example, it will be assumed that the subscriber at site $54_2$ is experiencing difficulties with data services (i.e. computing device $58_2$ is having difficulty communicating over Internet 70), and thus contacts the customer service representative at workstation 106 to notify service provider 66 of the problem. This step is represented in FIG. 3 by the dotted line indicated at "A", which represents a telephone call between telephony device $62_2$ and workstation 106. (It is to be understood that line A and the subsequent lines indicated by letter characters are intended to denote communications between particular components in system 50, and are not intended, unless so indicated, to denote the actual pathway over which such communications occur).

Figure 4:
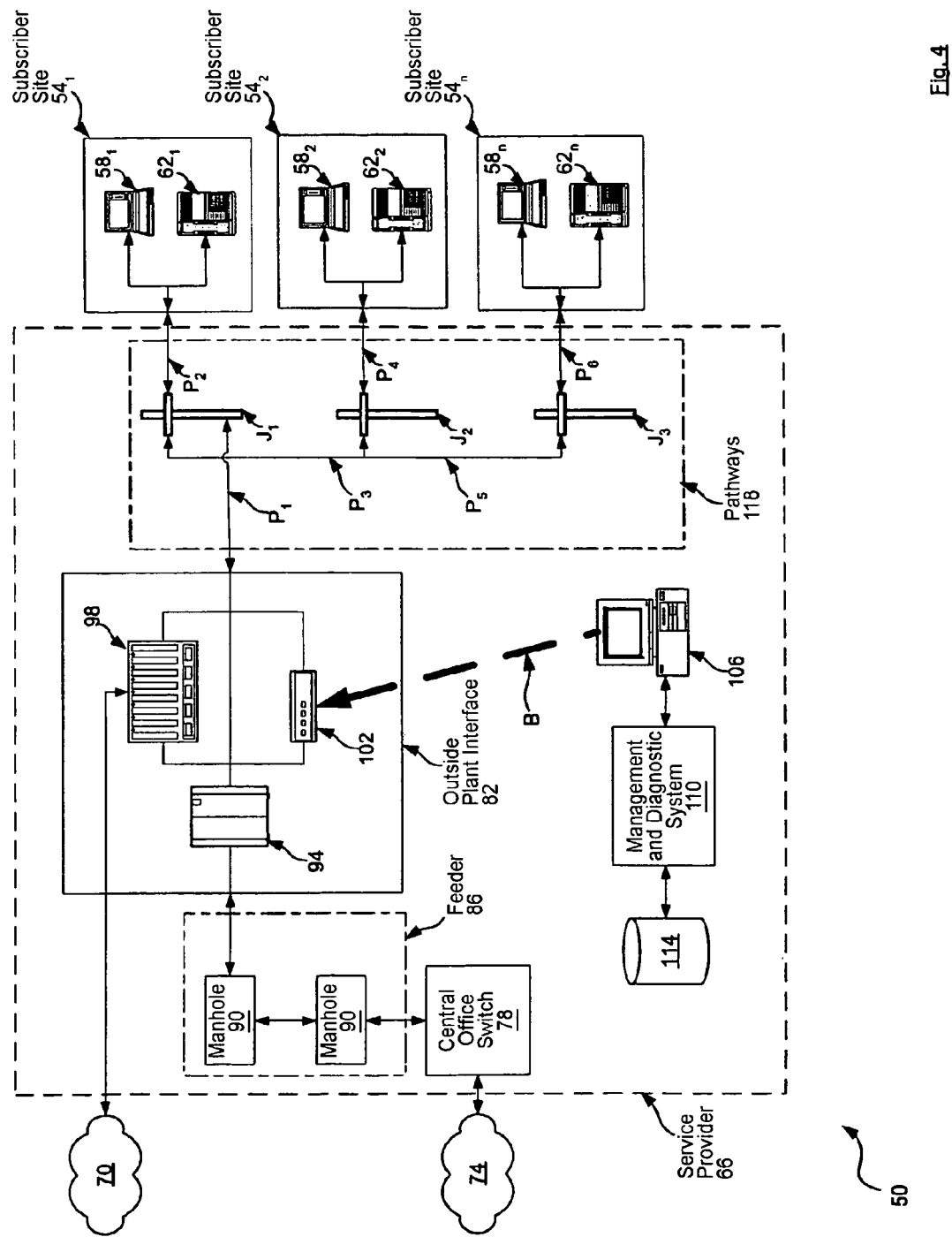
FIG. 4 shows the system of FIG. 1 during the performance of one of the steps of the method in FIG. 2.

Method 200 then advances to step 215, at which point a test head is activated along the subscriber site's pathway. Continuing with the example in relation to system 50, the customer service representative at workstation 106 will enter an instruction into workstation 106 to remotely activate test head 102 to cause test head 102 to test the integrity of the path(s) P from OPI 82 to site $54_2$. This step is represented in FIG. 4 by the dotted line indicated at "B", which represents an instruction from workstation 106 to test head 102 to commence a test along the pathways P belonging to subscriber site $54_2$.

Figure 5:
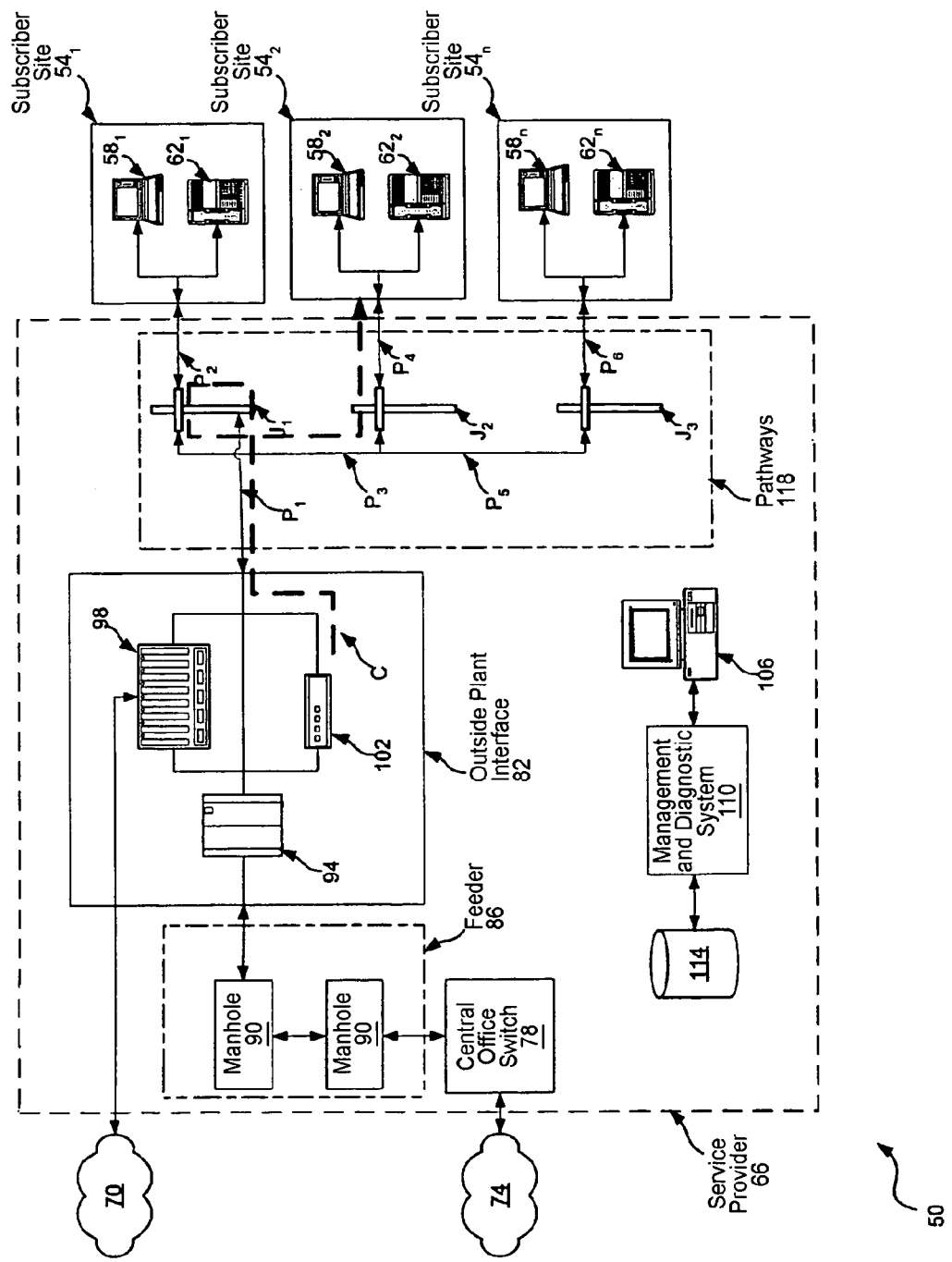
FIG. 5 shows the system of FIG. 1 during the performance of one of the steps of the method in FIG. 2.

Method 200 then advances to step 220, at which point a test signal is generated. Continuing with the example in relation to system 50, test head 102 will generate a waveform along the paths P corresponding to site 54. This signal is represented in FIG. 5 by the dotted line indicated at "C", which represents a test signal in the form of a waveform being generated by test head 102.

Figure 6:
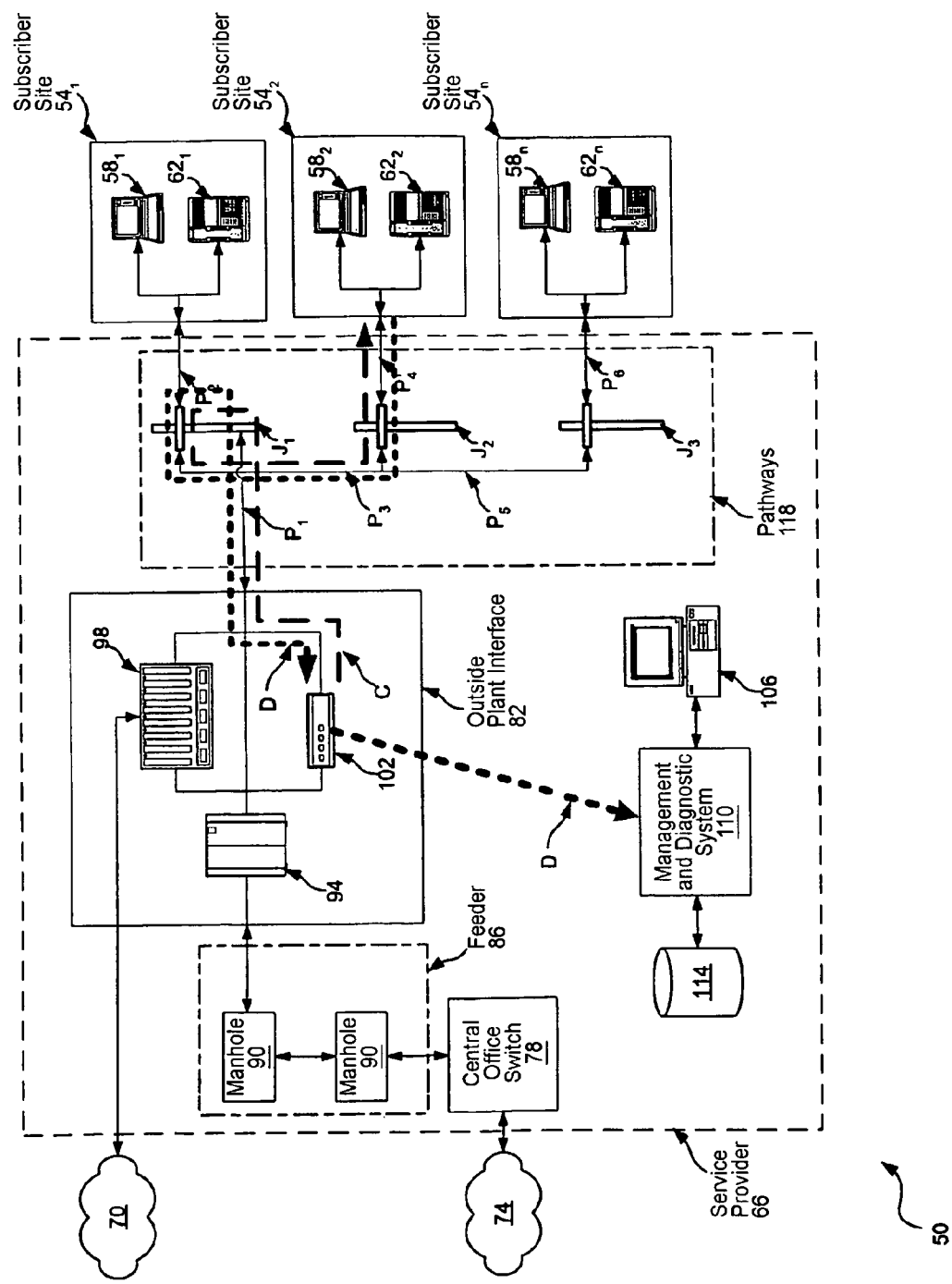
FIG. 6 shows the system of FIG. 1 during the performance of one of the steps of the method in FIG. 2.

Method 200 then advances to step 225, at which point a response to the test signal is received. Continuing with the example in relation to system 50, test head 102 will receive a reflection of signal C generated at step 220. This reflection is represented in FIG. 6 by the dotted line indicated at "D". (In this example, signal C was reflected once signal C reached junction $J_1$, to indicate that a fault exists at junction $J_1$, but it is to be understood that the signal C and reflection could occur anywhere along the paths P from OPI 82 to site 54 depending on where, and whether, there were any faults along that paths P.) Reflection D thus originates at junction $J_1$ and is returned to test head 102. In turn, test head 102 assembles the data representing signal C and reflection D, and sends that data to system 110 for further analysis.

Next, at step 230, location information for the cabling for the relevant subscriber site is received. In system 50, this step is performed by system 110, which loads cable information, such as the cable information stored in Table I, into system 110 from database 114.

Next, at step 235, the test signal from step 225 is matched with the location information from step 235. The way in which the particular matching is performed is not particularly limited, and a variety of operations can be conceived of which make use of the signal, waveform or other data from test head 102 and match it with cable information such as the cable information from Table I. The present example helps illustrate. Recall it was assumed that reflection D originated at junction $J_1$. Using known TDR technology, an analysis of reflection D indicates, for example, that reflection D commenced about three-hundred meters, from test head 102. By the same token, a review of Rows three through five (i.e. the rows associated with site $54_2$), and in particular an analysis of Row three, in Table I indicates that junction $J_1$ is located about three-hundred meters from OPI 82. Since three-hundred meters corresponds with the TDR measurement, a match is made between the location of the fault identified by test head 102 and the location of where that fault likely occurred based on analysis of Table I.

Next, at step 240, a determination is made as to where the fault is located. Since at step 230 a match was found in Table I suggesting that the fault is located at junction $J_1$ the determination at this step would arise directly from the match made at step 235.

Next at step 245, an output of the list of expected problem locations is generated. This step is performed by system 110, which can generate a specific report that identifies that a fault is expected to be found at junction $J_1$. This report can then be used to generate a work order that specifically instructs the service technician to attend at junction $J_1$ to repair the problem. This work order can thus reduce the amount of time, as the technician need not try to trace the entire set of paths P between OPI 82 and site $54_2$ to find the fault, but can be dispatched directly to a location where the fault is expected to lie. The list can include a primary location where potential problem is expected, and then a list of one or more additional, potential secondary fault locations to either side of primary location.

While only specific combinations of the various features and components of the present invention have been discussed herein, it will be apparent to those of skill in the art that desired subsets of the disclosed features and components and/or alternative combinations of these features and components can be utilized, as desired. For example, it is to be reiterated that the particular operations used at steps 235 and 240 are not particularly limited. Operations based on cable type and cable length can be tailored to help further improve the likelihood of specifically identifying a particular fault, and/or location thereof. For example, certain types of waveform reflections may be expected for cables having a particular number of bundles of twisted pairs contained therein, and/or whether or not the cable is air-filled, grease filled etc. Those expected types of waveforms can be compared with actually received waveform reflections to help further identify a particular fault and/or location thereof.

Figure 7:
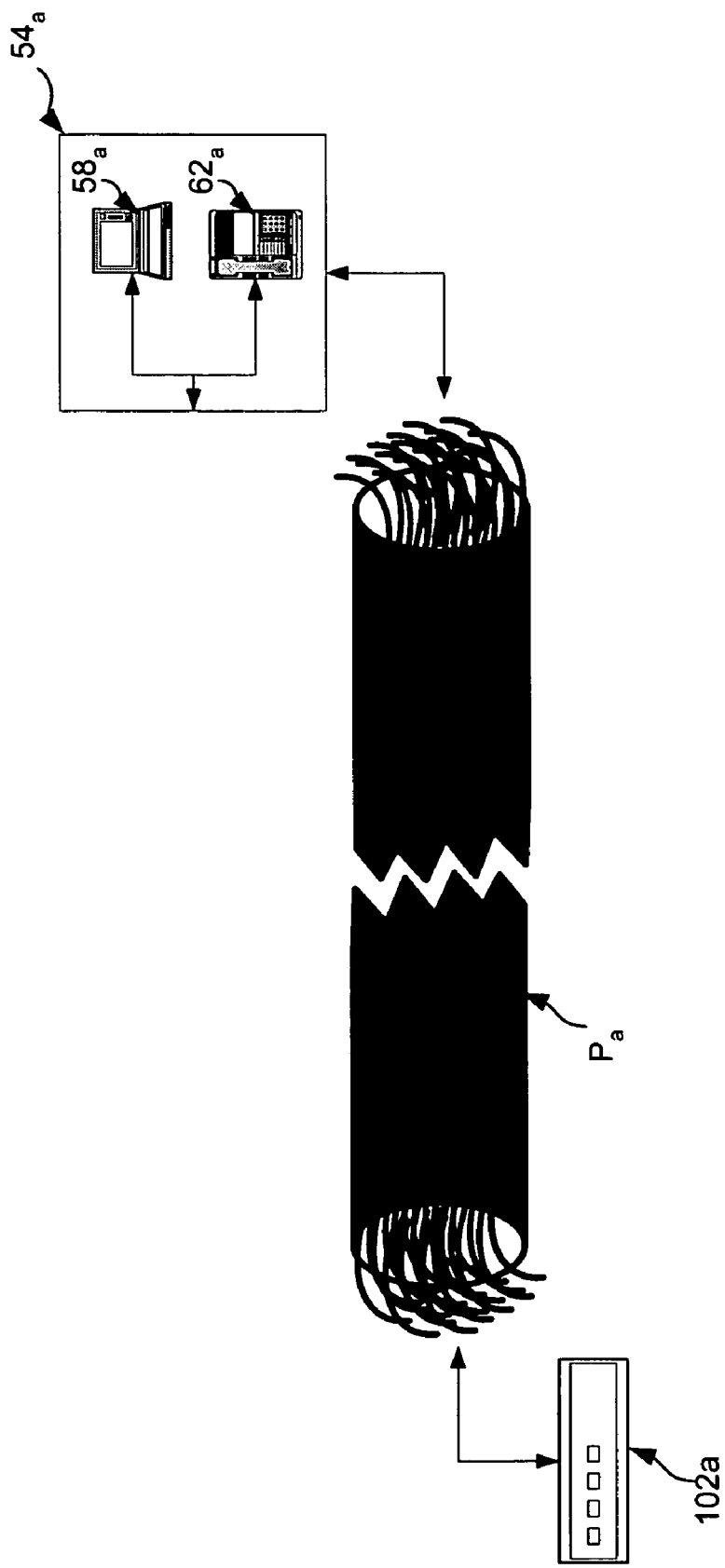
FIG. 7 shows a test head and a subscriber premises connected via a fibre optic cable in accordance with another embodiment of the invention; and, FIG. 8 shows a test head and a subscriber premises connected via a coaxial cable in accordance with another embodiment of the invention.

Additionally, while the embodiments discussed herein refer to TDR sent along a copper twisted pair, in other embodiments other types of testing can be performed. For example, a combination of TDR and frequency domain reflectometry can also be used. Other types of testing can be performed that are complementary to the type of cabling used. For example, for optical fibre cabling, optical TDR can be used. This example is shown in FIG. 7, wherein a fibre optic test head is indicated at 102a, and is connected to a subscriber premises 54a via a fibre optic cable $P_a$. While not shown in FIG. 7, those of skill in the art will recognize that system 50 can be modified to accommodate fibre optic cable $P_a$ in order to provide a link between subscriber premises 54a and the Internet 70 and/or the PSTN 74 and/or any other type of network as desired. Test head 102a can thus be introduced into that link to provide substantially the same testing as previously described.

Figure 8:
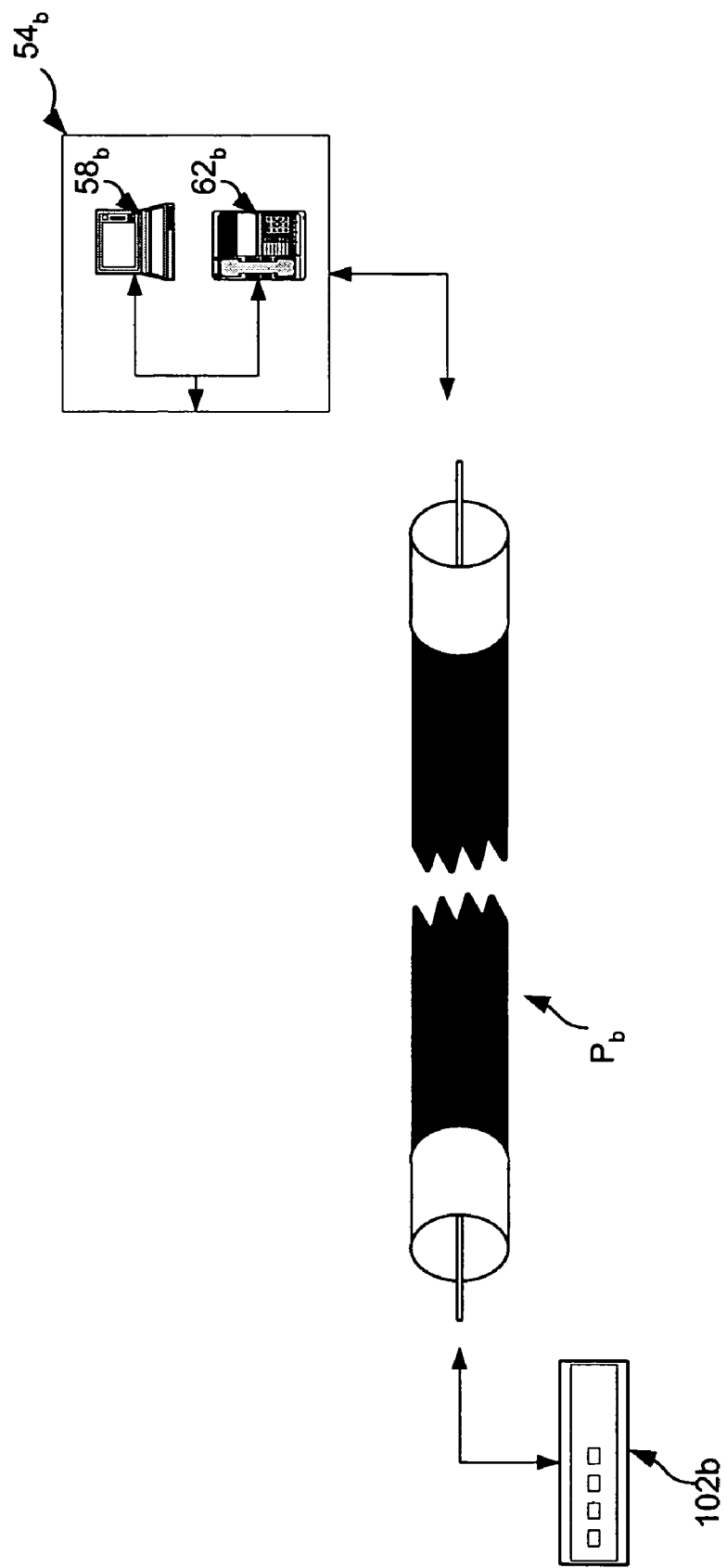

In another embodiment, coaxial cable can be used in place of twisted pair, with appropriate TDR tests being performed. This example is shown in FIG. 8, wherein a coaxial cable test head is indicated at 102b, and is connected to a subscriber premises 54b via a coaxial cable $P_b$. Those of skill in the art will now recognize that system 50 can be modified to accommodate coaxial cable $P_b$ in order to provide a link between subscriber premises 54b and the Internet 70 and/or the PSTN 74 and/or any other type of network as desired. Test head 102a can thus be introduced into that link to provide substantially the same testing as previously described.

Other types of cabling to which the teachings herein can apply, such as conventional power transmission lines which include appropriate equipment to carry data, with the appropriate selection of a test head generating the appropriate tests. Other types of testing will now occur to those of skill in the art.

Additionally, the types of reports generated at step 245 can be very sophisticated, including graphical maps, or computerized maps that appear on a computing console located in the service technician's truck. Additionally, global positioning system ("GPS") data, or the like, can be associated with each item in Table I, and this GPS data can also be used to generate very specific maps and/or locations for a service technician to use when attending at the identified location to repair the fault.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method for identifying a fault along a pathway, comprising:
receiving a response signal along at least a portion of said pathway, said response signal being received in response to a test signal;
processing said response signal to obtain response signal data indicative of a distance from a source location to said fault along said pathway;
receiving cable information associated with said pathway, said cable information specifying a plurality of physical locations along said pathway; each of said plurality of physical locations being associated with a respective distance along the pathway from said source location;
matching said response signal data with said cable information to identify one of said plurality of physical locations along said pathway as a potential physical location of said fault.

2. The method of claim 1, further comprising generating the test signal for transmission along said pathway.

3. The method of claim 2, wherein said generating the test signal comprises invoking at least one of a Time Domain Reflectometry (TDR) test, an Optical Test Domain Reflectometry (OTDR) test and a Frequency Domain Reflectometry (FDR) test.

4. The method of claim 2, wherein said pathway comprises a copper twisted pair spanning an outside plant interface and a subscriber premises, and wherein said test signal is generated by a test head mounted in said outside plant interface.

5. The method of claim 4, wherein said test head is remotely activatable in order to generate said test signal.

6. The method of claim 1, wherein said pathway comprises copper twisted pair.

7. The method of claim 1, wherein said pathway comprises coaxial cable.

8. The method of claim 1, wherein said pathway comprises fibre optical cable.

9. The method of claim 1, wherein said pathway comprises an electrical transmission line.

10. The method of claim 1, wherein said cable information is stored in a geographic information system database.

11. The method of claim 1, wherein said matching comprises comparing the distance from said source location to said fault along said pathway with said respective distance associated with each of said plurality of physical locations.

12. The method of claim 1, wherein a respective network component is located at each of said plurality of physical locations.

13. The method of claim 12, wherein each said network component comprises at least one of a cable bundle, a cable bundle of twisted pair, a junction, a bridge point, a splice point and a wire location.

14. A method for identifying a fault along a pathway, comprising:
receiving a response signal along at least a portion of said pathway, said response signal being received in response to a test signal;
processing said response signal to obtain response signal data indicative of a distance from a source location to said fault along said pathway;
receiving cable information associated with said pathway, said cable information specifying geographic coordinates of a plurality of physical locations along said pathway, each of said plurality of physical locations being associated with a respective distance along said pathway from said source location;
matching said response signal data with said cable information to identify the geographic coordinates of one of said plurality of physical locations along said pathway and deriving a potential physical location of said fault from the identified geographic coordinates.

15. The method of claim 14, wherein said geographic coordinates are derived from a Global Positioning System (GPS) and wherein said method further comprises delivering said geographic coordinates to a client device accessible to a service technician to be deployed for repairing said fault.

16. A system for identifying a fault along a pathway, comprising
a test head for sending a test signal along said pathway and for receiving a response signal corresponding to said test signal;
a computing device for receiving said response signal from said test head, said computing device operable to:
process said response signal to derive a distance from a test originating point to said fault along said pathway;
access a storage device connected to said computing device for storing cable information corresponding to said pathway; said cable information specifying a plurality of physical locations along said pathway; each of said plurality of physical locations being associated with a respective distance along said pathway from said test originating point;
receive said cable information from said storage device and perform a comparison between said distance from said test originating point to said fault with at least a portion of said cable information to identify one of said plurality of physical locations along said pathway as a potential location of said fault.

17. The system of claim 16, wherein said pathway comprises a copper twisted pair spanning an outside plant interface and a subscriber premises; and wherein said outside plant interface houses said test head; said test head being operable to generate said test signal.

18. The system of claim 17, wherein said test head is remotely activatable in order to generate said test signal.

19. The system of claim 16, wherein said pathway comprises copper twisted pair.

20. The system of claim 16, wherein said pathway comprises coaxial cable.

21. The system of claim 16, wherein said pathway comprises fibre optical cable.

22. The system of claim 16, wherein said pathway is an electrical transmission line.

23. A computing device for identifying a fault along a pathway, said computing device connectable to a test head operable to (i) send a test signal along said pathway; (ii) receive a response signal corresponding to said test signal; and (iii) deliver said response signal to said computing device; said response signal being representative of a distance from a test originating point to said fault along said pathway; said computing device further operable to:
access a storage device connected to said computing device for storing cable information corresponding to said pathway; said cable information specifying a plurality of physical locations along said pathway; each of said plurality of physical locations being associated with a respective distance along said pathway from said test originating point;

receive said cable information from said storage device and perform a comparison between said distance from said test originating point to said fault with at least a portion of said cable information to identify one of said plurality of physical locations along said pathway as a potential location of said fault.

24. The computing device of claim 23, wherein said computing device is further operable to match said distance from said test originating point to said fault along said pathway with said respective distance associated with each of said plurality of physical locations.

25. A computer readable medium containing a plurality of programming instructions for a computing device for identifying a fault along a path, said programming instructions including:

receiving a response signal along said path, said response signal being received in response to a test signal;

processing said response signal to obtain response signal data indicative of a distance from a test originating point to said fault along said path;

receiving location information corresponding to a physical pathway of said path; said location information specifying a plurality of physical locations along said path; each of said plurality of physical locations being associated with a respective distance along said path from said test originating point;

comparing said response signal data with said location information; and, outputting a potential physical location of said fault based on said comparing; said potential physical location being one of said plurality of physical locations along said path.

26. The computer readable medium of claim 25, wherein said comparing comprises matching said distance from said test originating point to said fault along said path with said respective distance associated with each of said plurality of physical locations.

* * * * *